US011919305B2

(12) United States Patent
Numajiri

(10) Patent No.: US 11,919,305 B2
(45) Date of Patent: Mar. 5, 2024

(54) LIQUID EJECTING HEAD WITH SEALING MEMBER, LIQUID EJECTING UNIT, LIQUID EJECTING DEVICE, AND METHOD OF MANUFACTURING LIQUID EJECTING UNIT

(71) Applicant: SEIKO EPSON CORPORATION, Tokyo (JP)

(72) Inventor: Tomohiro Numajiri, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 22 days.

(21) Appl. No.: 17/654,034

(22) Filed: Mar. 8, 2022

(65) Prior Publication Data

US 2022/0288927 A1 Sep. 15, 2022

(30) Foreign Application Priority Data

Mar. 15, 2021 (JP) ................................ 2021-041088

(51) Int. Cl.
*B41J 2/14* (2006.01)
*B41J 2/155* (2006.01)

(52) U.S. Cl.
CPC ................ *B41J 2/14* (2013.01); *B41J 2/155* (2013.01); *B41J 2202/21* (2013.01); *B41J 2202/22* (2013.01)

(58) Field of Classification Search
CPC ... B41J 2/14; B41J 2/155; B41J 2/1433; B41J 2202/22
See application file for complete search history.

(56) References Cited

U.S. PATENT DOCUMENTS

2014/0292905 A1* 10/2014 Hagiwara ................ B41J 2/155 347/22

FOREIGN PATENT DOCUMENTS

JP 2014208439 A 11/2014

* cited by examiner

*Primary Examiner* — Jason S Uhlenhake
(74) *Attorney, Agent, or Firm* — CHIP LAW GROUP

(57) ABSTRACT

A liquid ejecting head with a sealing member includes: a liquid ejecting head including a liquid ejecting surface configured to eject ink; a fixing member configured to be attachable to and detachable from the liquid ejecting head; and a sealing member configured to seal the liquid ejecting head and the fixing member. When the liquid ejecting head to which the fixing member is joined is mounted on a cover, the sealing member seals the liquid ejecting head and the cover.

12 Claims, 13 Drawing Sheets

LIQUID EJECTING HEAD WITH SEALING MEMBER, LIQUID EJECTING UNIT, LIQUID EJECTING DEVICE, AND METHOD OF MANUFACTURING LIQUID EJECTING UNIT

The present application is based on, and claims priority from JP Application Serial Number 2021-041088, filed Mar. 15, 2021, the disclosure of which is hereby incorporated by reference herein in its entirety.

BACKGROUND

1. Technical Field

The present disclosure relates to a liquid ejecting head with a sealing member, a liquid ejecting unit, a liquid ejecting device, and a method of manufacturing the liquid ejecting unit.

2. Related Art

JP-A-2014-208439 discloses an ink-jet type printer, which is an example of a liquid ejecting device that performs printing by discharging ink, which is an example of a liquid, on a printing sheet. This printer includes a plurality of liquid ejecting heads that eject ink from nozzles provided on liquid ejecting surfaces, a cover that covers the liquid ejecting surface side of the liquid ejecting heads to suppress disturbance in the air flow between the plurality of liquid ejecting heads and the printing sheet, and sealing members that seal openings provided in the cover to expose the liquid ejecting surfaces of the liquid ejecting heads and the liquid ejecting heads. In the liquid ejecting unit described in JP-A-2014-208439, sealing members are joined to openings of the cover to seal the openings, and the liquid ejecting heads are inserted into these openings to deform the sealing members, whereby the seal between seal portions with the liquid ejecting heads of the sealing members and the liquid ejecting heads is ensured.

However, in the liquid ejecting unit described in JP-A-2014-208439, deformation of the sealing members caused by mounting the liquid ejecting heads to the cover, which is an example of a mounting member, may affect seal portions with the cover of the sealing members, and decrease the sealing performance between the liquid ejecting heads and the cover.

SUMMARY

A liquid ejecting head with a sealing member to be mounted on a mounting member includes: a liquid ejecting head including a liquid ejecting surface configured to eject liquid, a fixing member configured to be attachable to and detachable from the liquid ejecting head, and a sealing member configured to seal the liquid ejecting head and the fixing member, wherein the sealing member includes a first seal portion and a second seal portion, the first seal portion seals the liquid ejecting head and the fixing member, and the second seal portion seals the fixing member of the liquid ejecting head mounted from the mounting direction and the mounting member.

A liquid ejecting unit includes: the liquid ejecting head with the sealing member, and a cover configured to be attachable to and detachable from the liquid ejecting head with the sealing member.

A liquid ejecting device includes the liquid ejecting unit.

A method of manufacturing a liquid ejecting unit includes: joining a fixing member to which a sealing member is fixed to a liquid ejecting head to bring the sealing member into contact with the liquid ejecting head and mounting the liquid ejecting head to which the fixing member is joined to a cover to bring the sealing member into contact with the cover to seal the liquid ejecting head and the cover.

DESCRIPTION OF EXEMPLARY EMBODIMENTS

Figure 1:
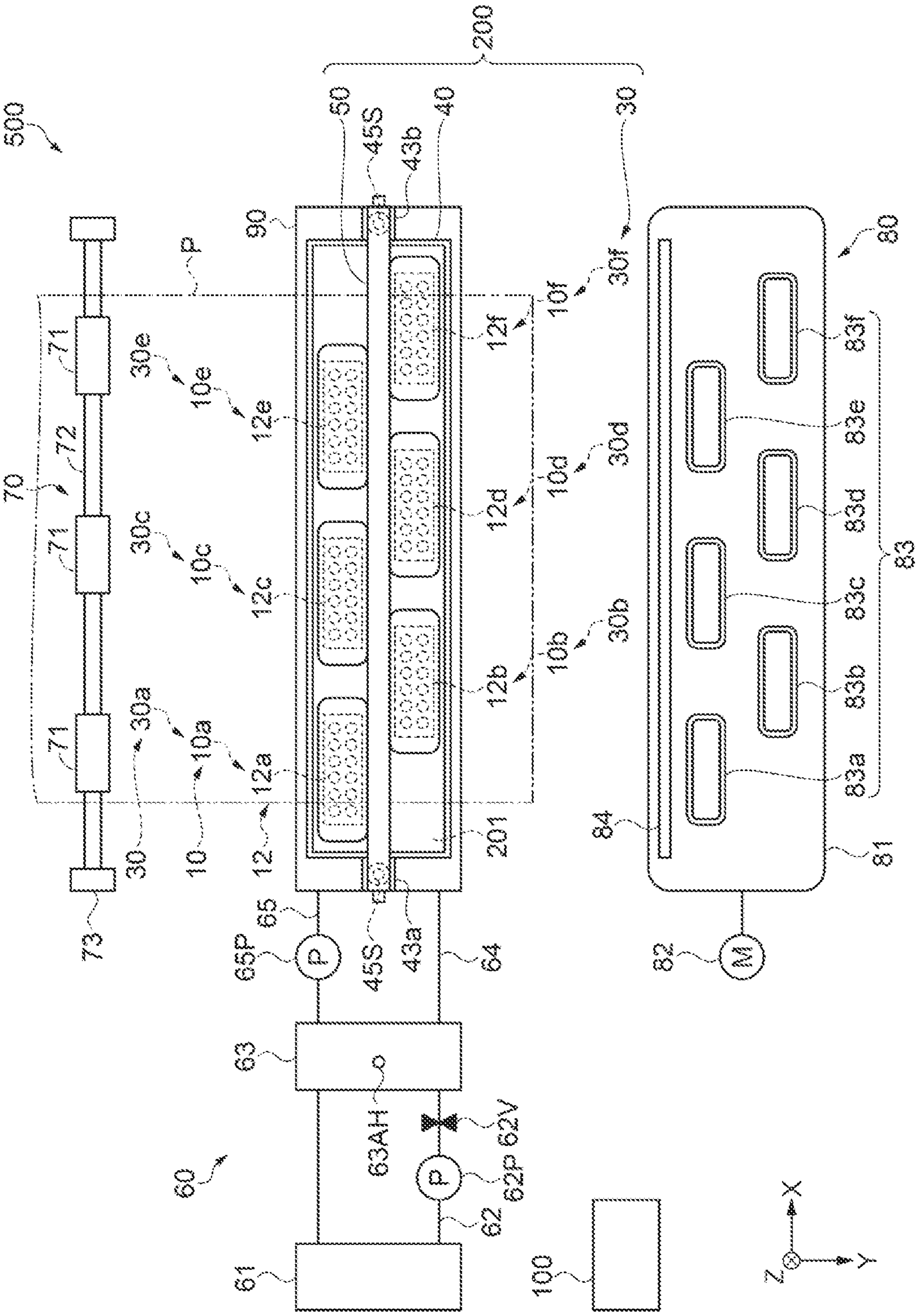
FIG. 1 is a block diagram illustrating a schematic configuration of a liquid ejecting device including a liquid ejecting head according to an embodiment of the present disclosure.

Hereinafter, the present disclosure will be described based on embodiments. Note that in the drawings, identical members are given the identical reference numerals, and redundant descriptions thereof will be omitted.

Furthermore, in the drawings, X, Y, and Z represent three spatial axes orthogonal to each other. Herein, the directions along these axes are the X-axis direction, the Y-axis direction, and the Z-axis direction. When specifying orientations, positive and negative signs are used in combination, with a positive direction being described as "+" and a negative direction being described as "−". Thus, any orientation toward an arrow in each figure is described as a + direction, while any direction opposite from an arrow is described as a − direction. Additionally, the Z-axis direction indicates the vertical direction, with the +Z direction indicating the vertically downward direction and the −Z direction indicating the vertically upward direction. Further, three spatial axes of X, Y, and Z not limited to the positive direction or the negative direction are described as the X-axis, the Y-axis, and the Z-axis.

1. Embodiment 1

In the present embodiment, a liquid ejecting device 500 is configured as an ink-jet type printer, and ejects ink onto a printing sheet P to form an image. Ink is an example of a liquid. The printing sheet P may be a cut sheet or may be a long continuous sheet. Furthermore, in place of the printing sheet P, any type of medium such as a resin film and fabric may be used as a target of ink discharge.

As illustrated in FIG. 1, a liquid ejecting device 500 includes a liquid ejecting unit 200, a liquid flow unit 60, a transport unit 70, a maintenance unit 80, a liquid ejecting unit holder 90, and a control unit 100.

The liquid ejecting unit 200 ejects ink in the +Z direction from a plurality of nozzles N constituting nozzle groups 12 to form an image on the printing sheet P. In the present embodiment, a voltage is applied to a piezoelectric element to change the volume of a liquid chamber leading to the nozzles N, thereby causing ink to be ejected from the nozzles N. However, for example, air bubbles may be generated in the nozzles N using a heat generating element to discharge ink by the air bubbles. The nozzle groups 12 constituted by the plurality of nozzles N are provided at an ejecting surface 201, which is the surface on the +Z direction side of the liquid ejecting unit 200.

The liquid ejecting unit 200 of the present embodiment is a so-called line head capable of forming an image on the printing sheet P, with the liquid ejecting unit holder 90 that holds the liquid ejecting unit 200 being fixed without moving in the X-axis direction. For this reason, in a state in which the liquid ejecting unit 200 is held by the liquid ejecting unit holder 90, of the plurality of nozzles N constituting the nozzle groups 12, the dimension between nozzles N at both ends in the X-axis direction is greater than the width dimension of the printing sheet P. Thus, the liquid ejecting device 500 of the present embodiment is a so-called line printer.

In the present embodiment, the ink ejected by the liquid ejecting unit 200 is in one color, for example a black ink. However, four liquid ejecting units 200 may be disposed spaced apart in the Y-axis direction to eject different ink, for example, ink of a total of four colors such as black, cyan, magenta, and yellow from the respective nozzle groups 12 included in the respective liquid ejecting units 200.

The liquid ejecting unit 200 includes liquid ejecting heads with sealing members 30, a cover 40, and a joining member 50. The liquid ejecting heads with the sealing members 30 includes liquid ejecting heads 10. The liquid ejecting heads 10 includes the nozzle groups 12. The liquid ejecting unit 200 is formed by mounting the liquid ejecting heads with the sealing members 30, which include the liquid ejecting heads 10 and seal portions 20 to be described later, to the cover 40. The cover 40 is an example of a mounting member. The liquid ejecting unit 200 of the present embodiment is formed by fixing the cover 40 to the joining member 50 to which the liquid ejecting heads with the sealing members 30 were joined. However, the liquid ejecting unit 200 of the present embodiment may be formed by mounting the liquid ejecting heads with the sealing members 30 to the cover 40 and directly fixing the liquid ejecting heads with the sealing members 30 to the cover 40.

In the present embodiment, the liquid ejecting heads with the sealing members 30 included in the liquid ejecting unit 200 is constituted by a plurality of liquid ejecting heads with sealing members 30*a*, 30*b*, 30*c*, 30*d*, 30*e*, and 30*f*. Thus, the liquid ejecting heads 10 are constituted by a plurality of liquid ejecting heads 10*a*, 10*b*, 10*c*, 10*d*, 10*e*, and 10*f*.

The liquid ejecting head with the sealing member 30*a* includes the liquid ejecting head 10*a*. The liquid ejecting head with the sealing member 30*b* includes the liquid ejecting head 10*b*. The liquid ejecting head with the sealing member 30*c* includes the liquid ejecting head 10*c*. The liquid ejecting head with the sealing member 30*d* includes the liquid ejecting head 10*d*. The liquid ejecting head with the sealing member 30*e* includes the liquid ejecting head 10*e*. The liquid ejecting head with the sealing member 30*f* includes the liquid ejecting head 10*f*.

The liquid ejecting head 10*a* includes a nozzle group 12*a* constituted by a plurality of nozzles N. The liquid ejecting head 10*b* includes a nozzle group 12*b* constituted by a plurality of nozzles N. The liquid ejecting head 10*c* includes a nozzle group 12*c* constituted by a plurality of nozzles N. The liquid ejecting head 10*d* includes a nozzle group 12*d* constituted by a plurality of nozzles N. The liquid ejecting head 10*e* includes a nozzle group 12*e* constituted by a plurality of nozzles N. The liquid ejecting head 10*f* includes a nozzle group 12*f* constituted by a plurality of nozzles N. The plurality of nozzles N constituting the respective nozzle groups 12*a*, 12*b*, 12*c*, 12*d*, 12*e*, and 12*f* form two rows of nozzle rows, with each row aligned in the X-axis direction and the two rows spaced apart in the Y-axis direction.

The plurality of nozzle groups 12*a*, 12*b*, 12*c*, 12*d*, 12*e*, and 12*f* included in the liquid ejecting unit 200 are aligned in the X-axis direction in the order of the nozzle groups 12*a*, 12*b*, 12*c*, 12*d*, 12*e*, and 12*f* in the +X direction and disposed in a so-called staggered manner, with the nozzle groups 12*a*, 12*c*, and 12*e* aligned along the X-axis being separated on the −Y direction side of the nozzle groups 12*b*, 12*d*, and 12*f* aligned along the X-axis. Consequently, the nozzle groups 12 of the liquid ejecting unit 200 capable of forming an image on the printing sheet P are formed, with the liquid ejecting unit holder 90 that holds the liquid ejecting unit 200 being fixed. Thus, the liquid ejecting unit 200 is formed by mounting the plurality of liquid ejecting heads with the sealing members 30*a*, 30*b*, 30*c*, 30*d*, 30*e*, and 30*f* to the cover 40 so that the plurality of nozzle groups 12*a*, 12*b*, 12*c*, 12*d*, 12*e*, and 12*f* are disposed in a staggered manner.

The liquid flow unit 60 includes a coupling flow path 62, a liquid storage unit 63, a supply flow path 64, and a return flow path 65. When a liquid container 61 is joined to the coupling flow path 62, the coupling flow path 62 allows the ink in the liquid container 61 to be supplied to the liquid storage unit 63. The liquid storage unit 63 stores the ink supplied from the liquid container 61. An atmospheric opening hole 63AH is provided on an upper surface of the liquid storage unit 63. Via the atmospheric opening hole 63AH, the internal space of the liquid storage unit 63 in which the ink is stored is in communication with the atmosphere serving as the external space.

A first pump 62P and an opening/closing valve 62V are provided in the coupling flow path 62. The first pump 62P is capable of causing ink to flow between the liquid container 61 and the liquid storage unit 63. For example, driving the first pump 62P supplies the ink in the liquid container 61 to the liquid storage unit 63, and adjusts the position in the Z-axis direction of the liquid surface of the ink stored in the liquid storage unit 63. The opening/closing valve 62V is capable of switching between an open state in which the flow of ink in the coupling flow path 62 is permitted and a closed state in which the flow of the ink is blocked. The liquid surface of the ink stored in the liquid storage unit 63 is adjusted to a position on the +Z direction side of the ejecting surface 201 of the liquid ejecting unit 200.

The supply flow path 64 couples the liquid storage unit 63 and the liquid ejecting unit 200 together so that the ink stored in the liquid storage unit 63 can be supplied to the liquid ejecting unit 200. The supply flow path 64 and the liquid storage unit 63 are coupled together at a side surface of the liquid storage unit 63. The coupling position of the supply flow path 64 with the liquid storage unit 63 is located on the +Z direction side of the atmospheric opening hole 63AH of the liquid storage unit 63.

The return flow path 65 couples the liquid storage unit 63 and the liquid ejecting unit 200 together so that the ink from the liquid ejecting unit 200 can be returned to the liquid storage unit 63. The return flow path 65 and the liquid storage unit 63 are coupled together at a side surface of the liquid storage unit 63. The coupling position of the return flow path 65 with the liquid storage unit 63 is located on the +Z direction side of the atmospheric opening hole 63AH of the liquid storage unit 63, and is located on the −Z direction side of the coupling position of the supply flow path 64 with the liquid storage unit 63. A second pump 65P is provided in the return flow path 65. The second pump 65P is capable of causing ink to flow between the liquid storage unit 63 and the liquid ejecting unit 200. Driving the second pump 65P flows the ink in the return flow path 65 in a return direction from the liquid ejecting unit 200 toward the liquid storage unit 63, and flows the ink in the supply flow path 64 in a supply direction from the liquid storage unit 63 toward the liquid ejecting unit 200.

The transport unit 70 transports the printing sheet P in a transport direction. As illustrated in FIG. 1, the transport direction in the present embodiment includes the +Y direction and the −Y direction. The transport unit 70 includes a transport rod 72 to which three transport rollers 71 are mounted, and a transport motor 73 that rotationally drives the transport rod 72. The transport motor 73 rotationally drives the transport rod 72, which causes the plurality of transport rollers 71 to rotate and the printing sheet P to be transported in the +Y direction of the transport direction. Note that the number of transport rollers 71 is not limited to three, and may be any number. Furthermore, a configuration including a plurality of transport units 70 may be adopted.

The maintenance unit 80 performs maintenance of the liquid ejecting unit 200. The maintenance unit 80 includes a maintenance unit holder 81, a maintenance unit driver 82, caps 83, and a wiper 84.

The caps 83 cover the ejecting surface 201 of the liquid ejecting unit 200 and suppress the volatilization of the solvent from ink via nozzles N, thereby performing maintenance of the liquid ejecting unit 200. Furthermore, ink may be discharged from nozzles N to the caps 83 to perform maintenance of the liquid ejecting unit 200. The caps 83 are held by the maintenance unit holder 81. Driving the maintenance unit driver 82 moves the maintenance unit holder 81 that holds the caps 83 in either the Y-axis direction or the Z-axis direction. Driving the maintenance unit driver 82 moves the caps 83 between a non-capping position in which the caps 83 are not in contact with the ejecting surface 201 and a capping position in which the caps 83 cover the ejecting surface 201.

The caps 83 in the present embodiment include a cap 83*a* corresponding to the nozzle group 12*a*, a cap 83*b* corresponding to the nozzle group 12*b*, a cap 83*c* corresponding to the nozzle group 12*c*, a cap 83*d* corresponding to the nozzle group 12*d*, a cap 83*e* corresponding to the nozzle group 12*e*, and a cap 83*f* corresponding to the nozzle group 12*f*.

The wiper 84 wipes the ejecting surface 201 of the liquid ejecting unit 200 to perform maintenance of the liquid ejecting unit 200. The wiper 84 is held by the maintenance unit holder 81. Driving the maintenance unit driver 82 moves the wiper 84 in the Z-axis direction between a standby position in which the wiper 84 is not in contact with the ejecting surface 201 and a wiping position in which the wiper 84 is capable of coming into contact with the ejecting surface 201. In the present embodiment, driving the maintenance unit driver 82 with the wiper 84 being in the wiping position moves the maintenance unit holder 81 that holds the wiper 84 in the Y-axis direction to wipe the ejecting surface 201.

As illustrated in FIG. 1, the liquid ejecting unit holder 90 detachably holds the liquid ejecting unit 200. The liquid ejecting unit 200 is held by the liquid ejecting unit holder 90, whereby the liquid ejecting unit 200 is coupled with the supply flow path 64 and the return flow path 65 of the liquid flow unit 60. Furthermore, the liquid ejecting unit 200 is held by the liquid ejecting unit holder 90, whereby the liquid ejecting unit 200 and the printer side of the liquid ejecting device 500 is electrically coupled together.

The control unit 100 controls the entire liquid ejecting device 500. For example, the control unit 100 controls a flow operation of the ink by the liquid flow unit 60, a transport operation along the transport direction of the printing sheet P by the transport unit 70, an ejecting operation of the ink from the nozzles N of the liquid ejecting unit 200, a maintenance operation of the liquid ejecting unit 200 by the maintenance unit 80, and the like. The control unit 100 may be constituted by a processing circuit such as a central processing unit (CPU) or a field programmable gate array (FPGA), and a storage circuit such as a semiconductor memory.

Next, a detailed configuration of the liquid ejecting head with the sealing member 30, the cover 40, and the joining member 50 included in the liquid ejecting unit 200 will be described with reference to drawings.

Figure 2:
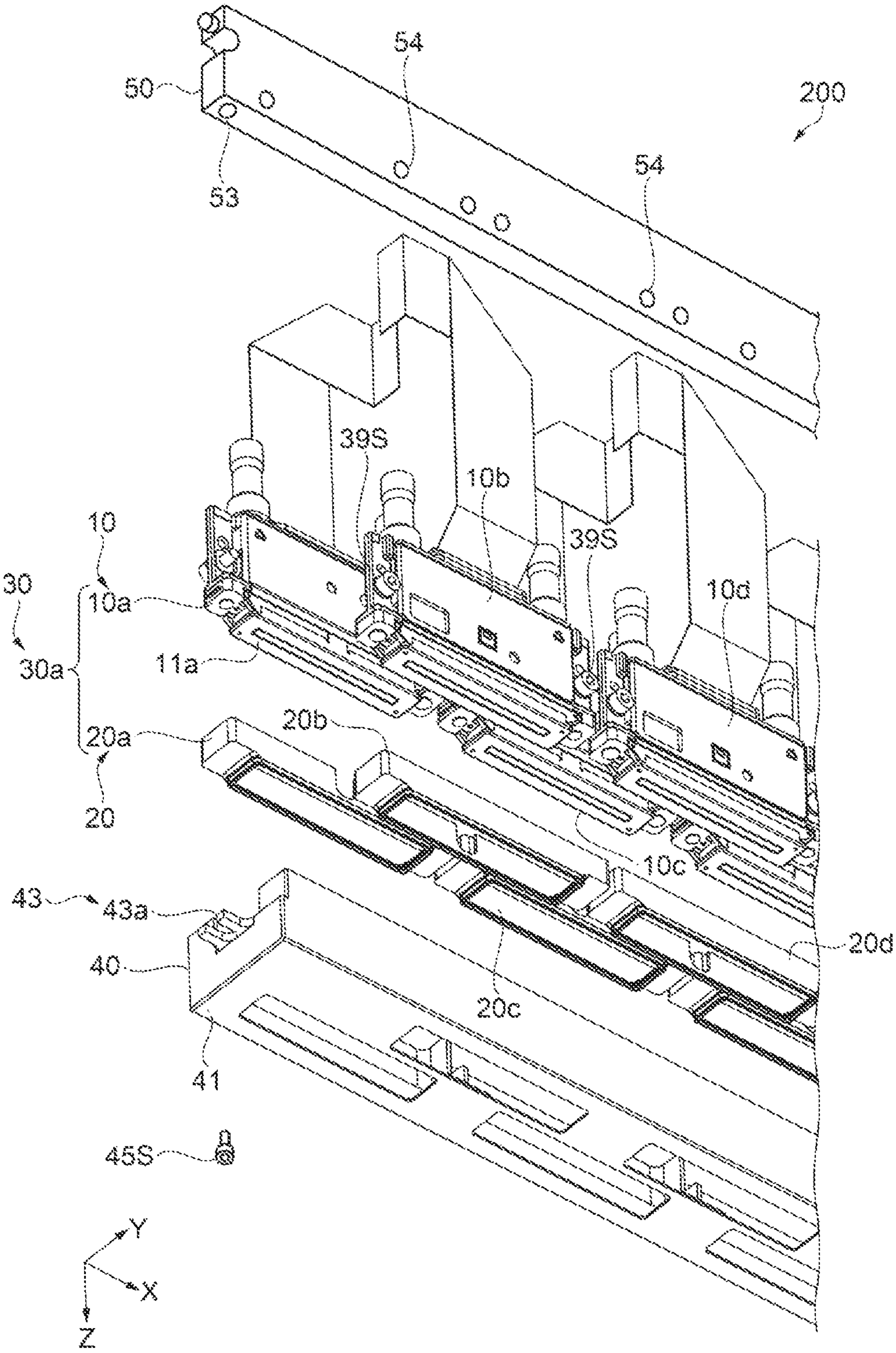
FIG. 2 is an exploded perspective view of a liquid ejecting unit as viewed from a cover side.
Figure 3:
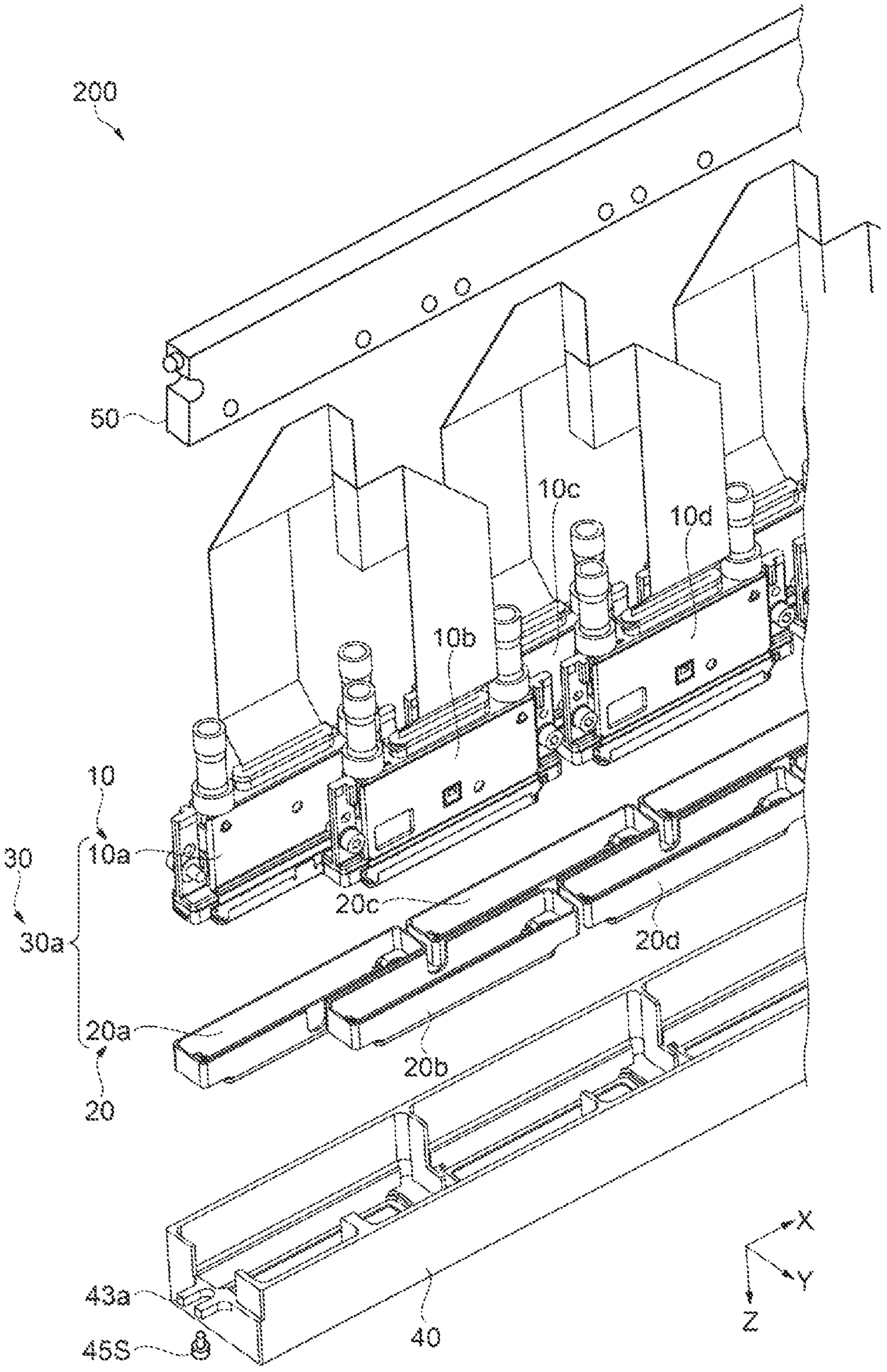
FIG. 3 is an exploded perspective view of a liquid ejecting unit as viewed from a joining member side.
Figure 5:
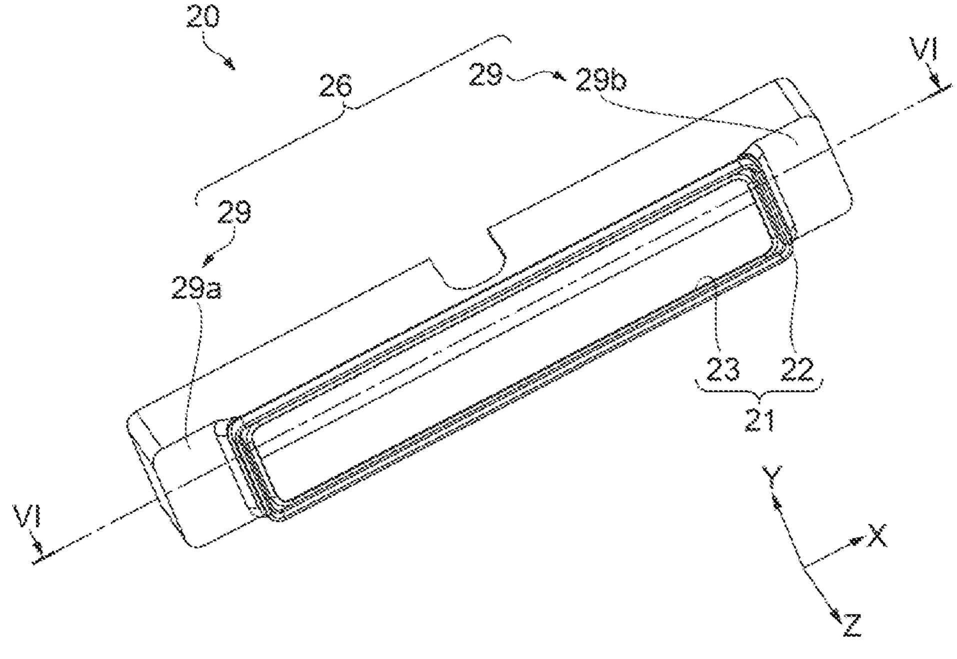
FIG. 5 is a perspective view illustrating a seal portion.
Figure 6:
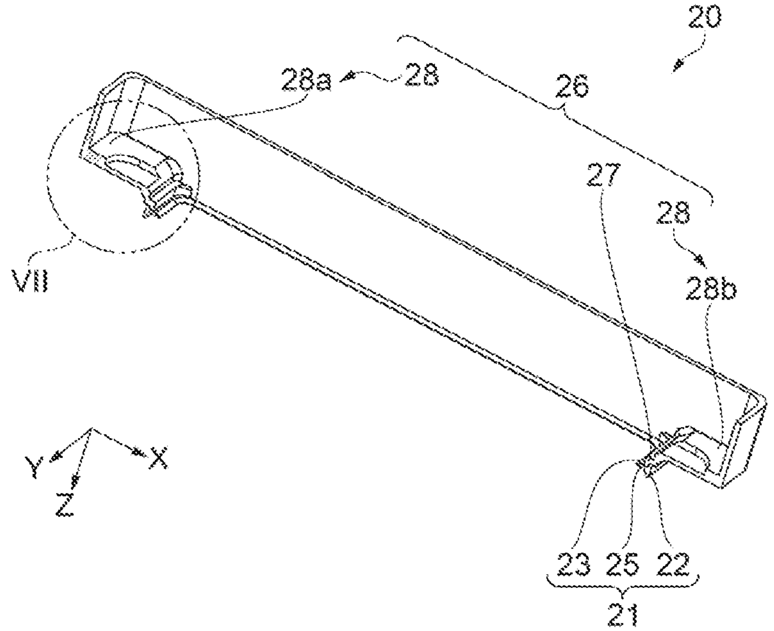
FIG. 6 is a cross-sectional perspective view illustrating a cross-section VI-VI of the seal portion illustrated in FIG. 5.
Figure 7:
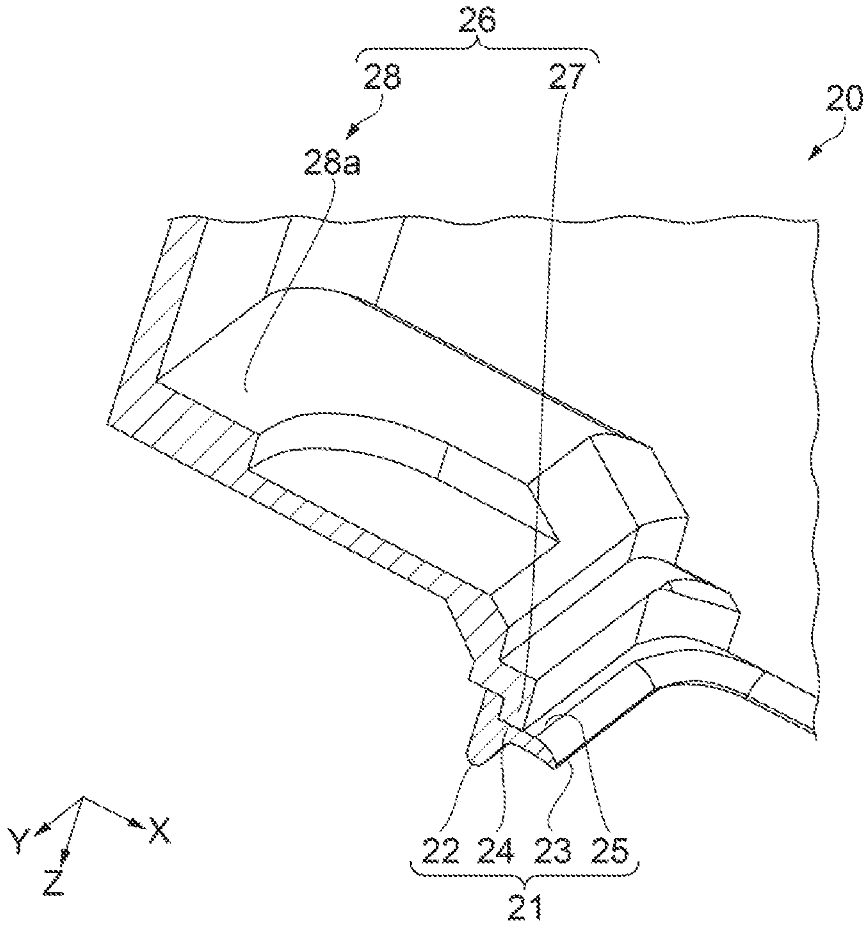
FIG. 7 is a cross-sectional perspective view illustrating a portion VII of the seal portion illustrated in FIG. 6.
Figure 8:
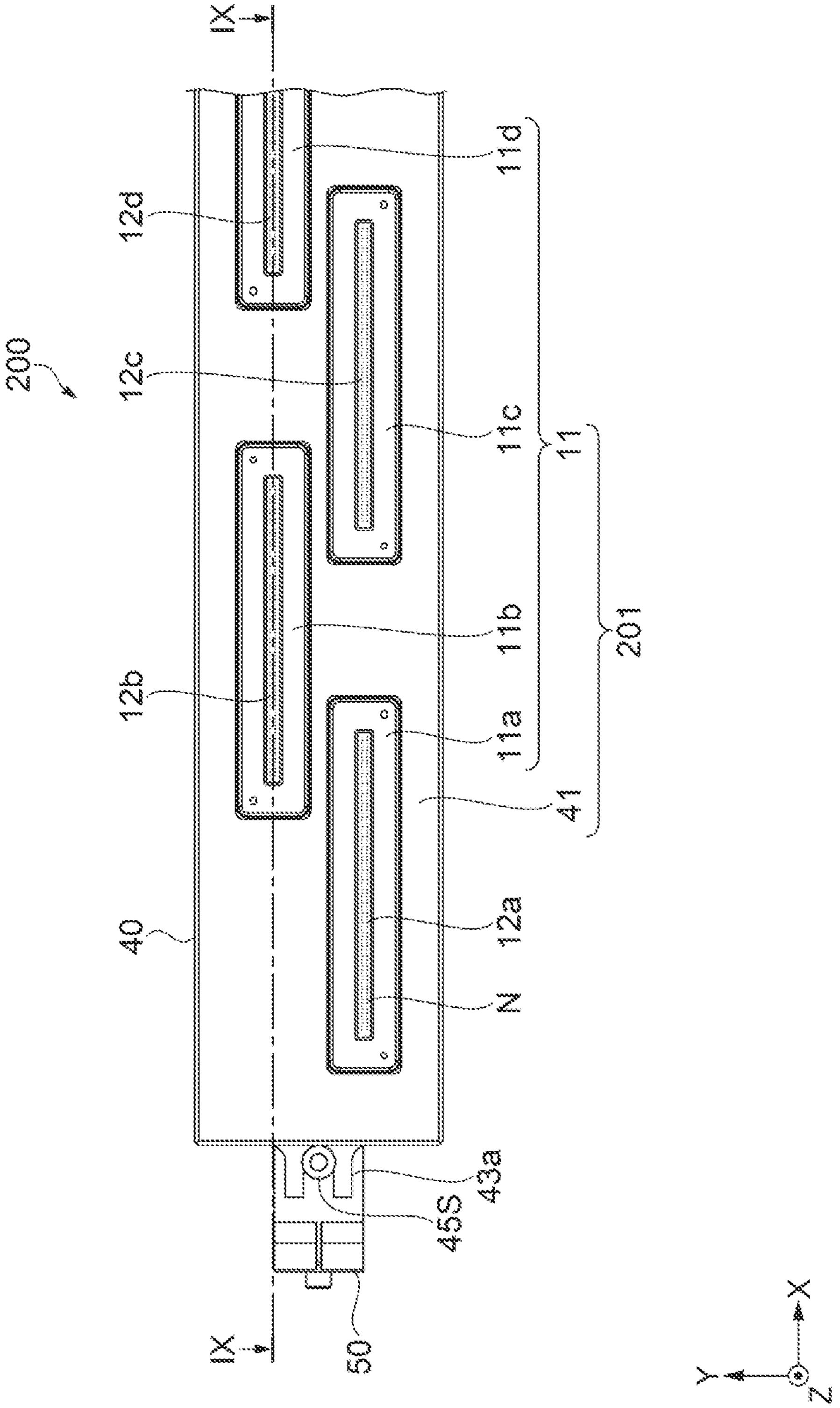
FIG. 8 is a partial plan view of a liquid ejecting unit as viewed from an ejecting surface side.
Figure 9:
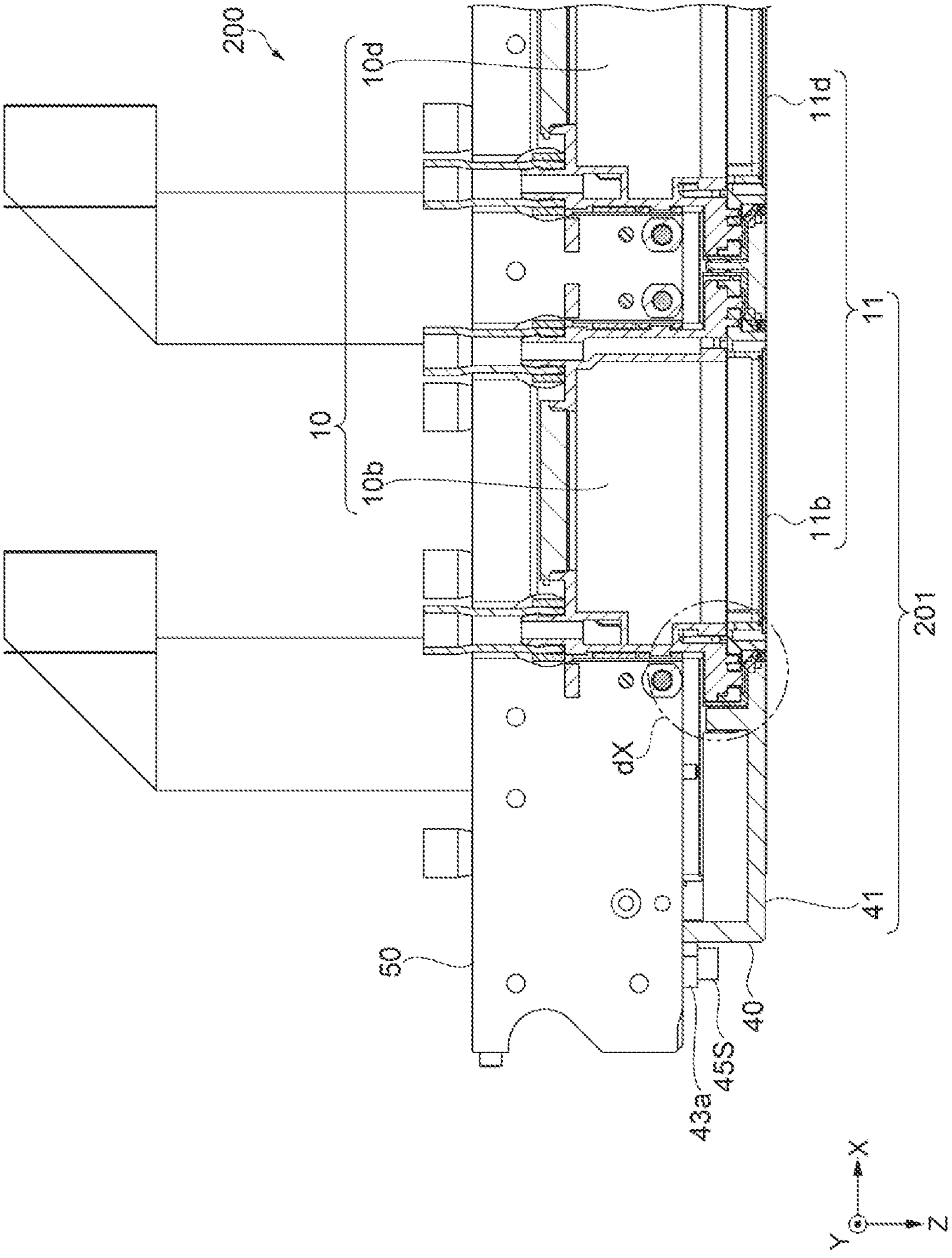
FIG. 9 is a partial cross-sectional view illustrating a cross-section IX-IX of the liquid ejecting unit illustrated in FIG. 8.
Figure 10:
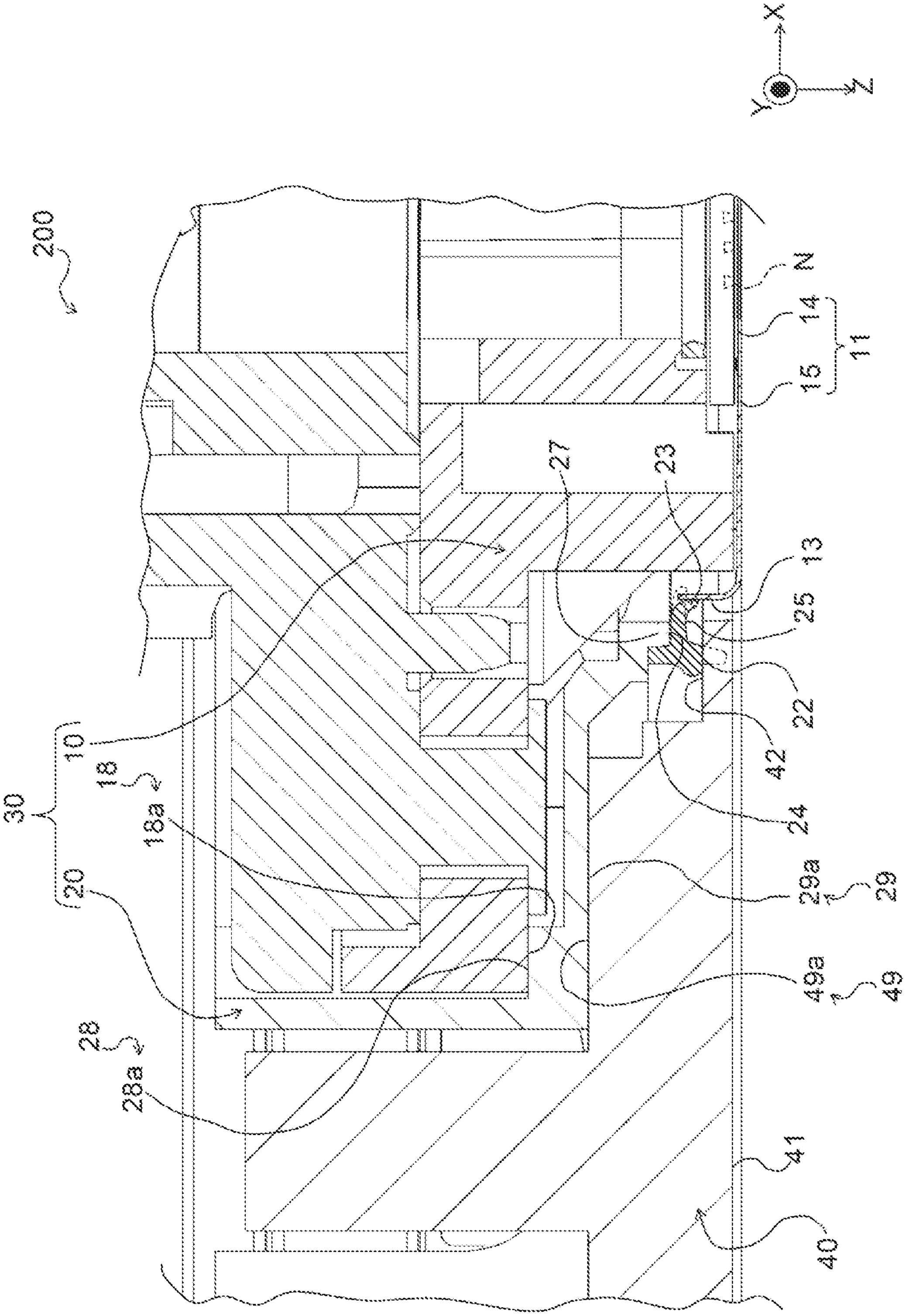
FIG. 10 is a partial cross-sectional view illustrating a portion dX of the liquid ejecting unit illustrated in FIG. 9.

As illustrated in FIGS. 2 and 3, the liquid ejecting head with the sealing member 30 includes the liquid ejecting head 10 and the seal portion 20. Furthermore, as illustrated in FIGS. 5 to 7, the seal portion 20 includes a sealing member 21 and a fixing member 26.

Figure 4:
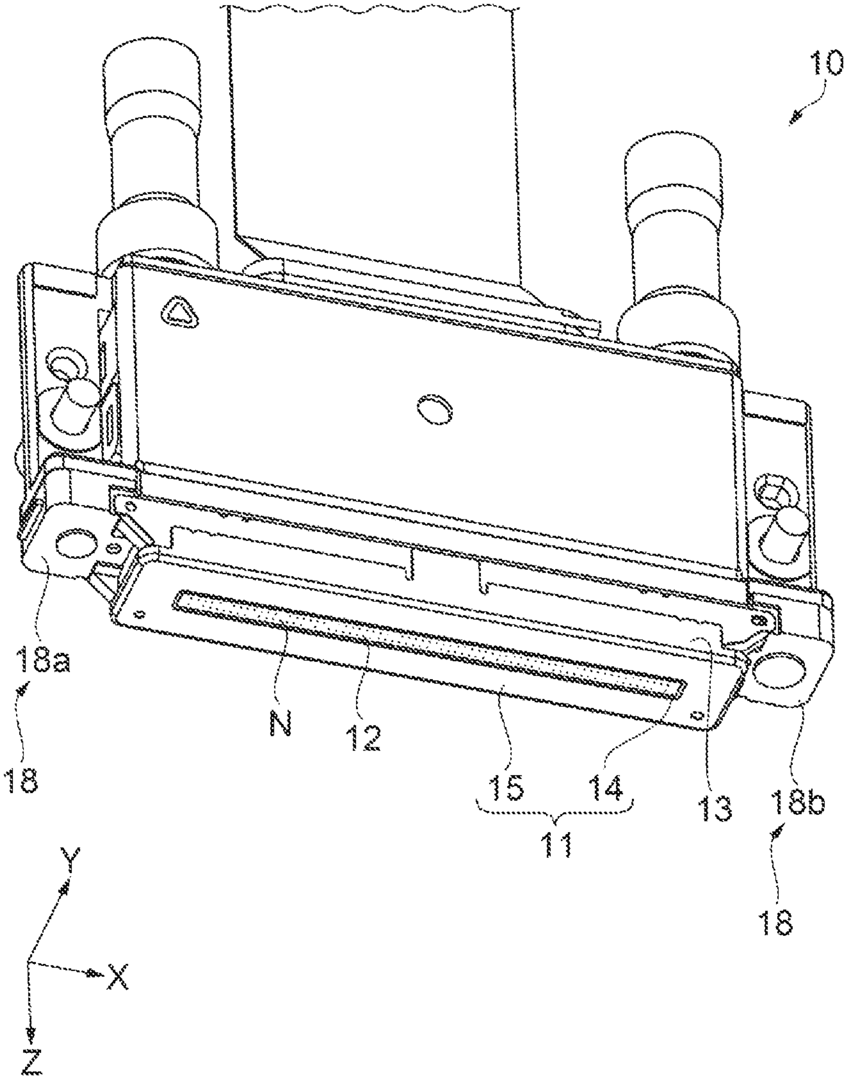
FIG. 4 is a perspective view illustrating a liquid ejecting head.

As illustrated in FIG. 4, the liquid ejecting head 10 includes a plurality of nozzles N, a nozzle forming member 14, a head cover 15, a first sealed portion 13, and head-side positioning portions 18. The plurality of nozzles N form a nozzle group 12. The nozzle forming member 14 is a member in which the nozzles N are formed, and the nozzles N are open to the surface on the +Z direction side. The head cover 15 is a sheet metal member provided covering the +Z direction side of the nozzle forming member 14. A through hole is provided in the surface on the +Z direction side of the head cover 15 so that the opening of the nozzles N forming the nozzle group 12 is exposed to the +Z direction side. The liquid ejecting surface 11 is constituted by a surface on the +Z direction side of the nozzle forming member 14 and a surface on the +Z direction side of the head cover 15.

The head cover 15 is provided with an outer side surface, formed by drawing, that continuously extends in the −Z direction from the outer edge of the surface on the +Z direction side of the head cover 15 constituting the liquid ejecting surface 11 so as to surround the surface on the +Z direction side of the head cover 15. The outer side surface of the head cover 15 has a quadrangular annular shape with four rounded corners. The first sealed portion 13 is a portion of the outer side surface of the head cover 15 that a first seal portion 23 to be described later of the sealing member 21 in the seal portion 20 comes into contact with and seals. The outer side surface of the head cover 15 is an example of a side surface of the liquid ejecting head 10.

The head-side positioning portions 18 are positioning surfaces that come into contact with first fixing member-side positioning portions 28 to be described later of the fixing member 26 in the seal portion 20, and thereby defines the positions in the Z-axis direction between the liquid ejecting head 10 and the seal portion 20. The head-side positioning portions 18 are located, in the Z-axis direction, on the −Z direction side of the liquid ejecting surface 11. The head-side positioning portions 18 include, in the X-axis direction, a head-side positioning portion 18*a* located on the −X direction side of the liquid ejecting surface 11, and a head-side positioning portion 18*b* located on the +X direction side of the liquid ejecting surface 11.

As illustrated in FIGS. 5 to 7, the seal portion 20 includes the fixing member 26 and the sealing member 21. Thus, the liquid ejecting head with the sealing member 30 includes the liquid ejecting head 10, the fixing member 26, and the sealing member 21. The seal portion 20 is detachably provided on the liquid ejecting surface 11 side of the liquid ejecting head 10. The seal portion 20 is formed by fixing the sealing member 21 to the fixing member 26. In other words, the seal portion 20 is the fixing member 26 to which the sealing member 21 is fixed. The fixing member 26 is detachably joined to the liquid ejecting surface 11 side of the liquid ejecting head 10.

The fixing member 26 includes a fixing portion 27, the first fixing member-side positioning portions 28, and second fixing member-side positioning portions 29. The fixing member 26 is configured to cover the liquid ejecting surface 11 side of the liquid ejecting head 10. The fixing member 26 is configured to be attachable to and detachable from the liquid ejecting head 10. The fixing member 26 may be formed from resin or a metal. The fixing member 26 of the present embodiment is formed from stainless steel. Furthermore, stainless steel such as SUS630, SUS304, and SUS430 can be employed.

A through hole is provided in the fixing member 26 so that the liquid ejecting surface 11 of the liquid ejecting head 10 is exposed to the +Z direction side. The through hole is quadrangular with four rounded corners. The fixing portion 27 is a surface on the +Z direction side of an annular-shaped portion that demarcates the shape of the through hole of the fixing member 26. For this reason, the fixing portion 27 has a quadrangular annular shape with four rounded corners. The seal portion 20 is formed by fixing a fixed portion 24 to be described later of the sealing member 21 to the fixing portion 27.

The first fixing member-side positioning portions 28 are positioning surfaces that come into contact with the head-side positioning portions 18 of the liquid ejecting head 10, and thereby define the positions in the Z-axis direction between the liquid ejecting head 10 and the fixing member 26. In a state of the liquid ejecting head with the sealing member 30 in which the seal portion 20 is joined to the liquid ejecting head 10, the first fixing member-side positioning portions 28 are in contact with the head-side positioning portions 18 of the liquid ejecting head 10, whereby the positions in the Z-axis direction between the liquid ejecting head 10 and the fixing member 26 are defined. As a result, the positions in the Z-axis direction between the liquid ejecting head 10 and the sealing member 21 are defined via the fixing member 26. The first fixing member-side positioning portions 28 are located, in the Z-axis direction, on the −Z direction side of the fixing portion 27. The first fixing member-side positioning portions 28 include, in the X-axis direction, a first fixing member-side positioning portion 28*a* located on the −X direction side of the fixing member 27, and a first fixing member-side positioning portion 28*b* located on the +X direction side of the fixing member 27.

The second fixing member-side positioning portions 29 are positioning surfaces that come into contact with cover-side positioning portions 49 to be described later of the cover 40, and thereby defines the positions in the Z-axis direction between the fixing member 26 and the cover 40. In a state in which the liquid ejecting head with the sealing member 30 is mounted on the cover 40, the second fixing member-side positioning portions 29 are in contact with the cover-side positioning portions 49 to be described later of the cover 40, whereby the positions in the Z-axis direction between the fixing member 26 and the cover 40 are defined. As a result, the positions in the Z-axis direction between the liquid ejecting head 10 and the cover 40 are defined. Furthermore, the positions in the Z-axis direction between the sealing member 21 and the cover 40 are defined via the fixing member 26. The second fixing member-side positioning portions 29 are located, in the Z-axis direction, on the −Z direction side of the fixing portion 27 and the first fixing member-side positioning portions 28. The second fixing member-side positioning portions 29 include, in the X-axis direction, a second fixing member-side positioning portion 29*a* located on the −X direction side of the fixing member 27, and a second fixing member-side positioning portion 29*b* located on the +X direction side of the fixing member 27.

The sealing member 21 seals between the liquid ejecting head 10 and the fixing member 26. The sealing member 21 includes a fixed portion 24, a first seal portion 23, a second seal portion 22, and a thin film portion 25. The sealing member 21 is formed from a rubber member or a resin elastomer having elasticity. The sealing member 21 of the present embodiment is a silicone rubber. The sealing member 21 of the present embodiment is integrally formed with the fixing member 26, and thus is fixed to the fixing member 26.

The fixed portion 24 has a quadrangular annular shape with four rounded corners. A surface on the −Z direction side of the fixed portion 24 is fixed to the fixing portion 27 of the fixing member 26. The fixed portion 24 is fixed to the fixing portion 27, whereby the position of the sealing member 21 relative to the fixing member 26 is defined. In the present embodiment, the fixed portion 24 is fixed to the fixing portion 27 in a liquid-tight manner.

The second seal portion 22 comes into contact with a second sealed portion 42 to be described later of the cover 40 to seal between the fixing member 26 and the cover 40. For this reason, the second seal portion 22 has a quadrangular annular shape with four rounded corners. The second seal portion 22 is provided surrounding the outer side of the fixed portion 24 when the sealing member 21 is viewed from the +Z direction side. Furthermore, the second seal portion 22 is located, in the Z-axis direction, on the +Z direction side of the first seal portion 23 and the fixed portion 24.

The first seal portion 23 comes into contact with the first sealed portion 13 of the liquid ejecting head 10 to seal between the liquid ejecting head 10 and the fixed member 26. For this reason, the first seal portion 23 has a quadrangular annular shape with four rounded corners, and the inner circumferential length thereof is shorter than the circumferential length of the first sealed portion 13. The first seal portion 23 is located on the −Z direction side of the second seal portion 22. The first seal portion 23 is located, in the Z-axis direction, between the fixing portion 27 of the fixing member 26 and the second seal portion 22. Furthermore, the first seal portion 23 is provided on the inner side of the fixed portion 24 when the sealing member 21 is viewed from the +Z direction side. Thus, the fixed portion 24 is provided between the first seal portion 23 and the second seal portion 22 in a direction along the liquid ejecting surface 11. Furthermore, in the form of the liquid ejecting head with the sealing member 30, the first seal portion 23, the fixed portion 24, and the second seal portion 22 are provided, in a direction along the liquid ejecting surface 11, in this order from a position closer to the liquid ejecting head 10 toward a position farther therefrom.

The thin film portion 25 couples the fixed portion 24 and the first seal portion 23, which are separated from each other in a direction intersecting the Z-axis direction. In other words, the thin film portion 25 couples the fixed portion 24 and the first seal portion 23 in a direction intersecting the Z-axis direction. Furthermore, in the form of the liquid ejecting head with the sealing member 30, the thin film portion 25 couples the fixed portion 24 and the first seal portion 23 in a direction along the liquid ejecting surface 11. The dimension in the Z-axis direction of the thin film portion 25 is smaller than the dimension from the fixing portion 27 to the second seal portion 22 of the fixing member 26.

As shown in FIGS. 1-3 and 8-10, the cover 40 includes a cover front surface 41, the second sealed portions 42, the cover-side positioning portions 49, and screw fixing portions 43. The cover 40 is configured to cover the liquid ejecting surface 11 side of the liquid ejecting heads 10 included in the liquid ejecting heads with the sealing members 30. The cover 40 may be formed from resin or a metal. The cover 40 of the present embodiment is formed from stainless steel. Stainless steel such as SUS304, SUS430, and SUS630 can be employed.

The cover front surface 41 is a surface on the +Z direction side of the cover 40. Through holes are provided in the cover front surface 41 so that the liquid ejecting surfaces 11 of the liquid ejecting heads 10 included in the liquid ejecting heads with the sealing members 30 are exposed. The through holes of the cover front surface 41 are quadrangular with four rounded corners. The cover front surface 41 and the liquid ejecting surfaces 11 of the liquid ejecting heads 10 included in the liquid ejecting heads with the sealing members 30 constitute the ejecting surface 201 of the liquid ejecting unit 200.

In the cover front surface 41 of the present embodiment, a plurality of through holes are provided so that the respective liquid ejecting surfaces 11*a*, 11*b*, 11*c*, 11*d*, 11*e*, and 11*f* of the liquid ejecting heads 10*a*, 10*b*, 10*c*, 10*d*, 10*e*, and 10*f* included in the plurality of liquid ejecting heads with the sealing members 30*a*, 30*b*, 30*c*, 30*d*, 30*e*, and 30*f* are exposed, respectively. In the present embodiment, the cover front surface 41 and the liquid ejecting surfaces 11*a*, 11*b*, 11*c*, 11*d*, 11*e*, and 11*f* of the plurality of liquid ejecting heads with the sealing members 30*a*, 30*b*, 30*c*, 30*d*, 30*e*, and 30*f* constitute the ejecting surface 201 of the liquid ejecting unit 200.

The second sealed portions 42 are provided on the opposite surface of the cover front surface 41. The second sealed portions 42 are located on the −Z direction side of the cover front surface 41. The second sealed portions 42 and the second seal portions 22 of the seal portions 20 included in the liquid ejecting heads with the sealing members 30 come into contact with each other to seal between the fixing members 26 and the cover 40. For this reason, the second sealed portions 42 have quadrangular annular shapes with four rounded corners in correspondence with the second seal portions 22. Furthermore, the second sealed portions 42 are provided surrounding the outer side of the through holes through which the liquid ejecting surfaces 11 of the liquid ejecting heads 10 included in the liquid ejecting heads with the sealing members 30 are exposed. The cover 40 of the present embodiment includes a plurality of second sealed portions 42*a*, 42*b*, 42*c*, 42*d*, 42*e*, and 42*f* in correspondence with the seal portions 20*a*, 20*b*, 20*c*, 20*d*, 20*e*, and 20*f* included in the plurality of liquid ejecting heads with the sealing members 30*a*, 30*b*, 30*c*, 30*d*, 30*e*, and 30*f*, respectively.

The cover-side positioning portions 49 are provided on the opposite surface of the cover front surface 41. The cover-side positioning portions 49 are located on the −Z direction side of the cover front surface 41 and the second sealed portions 42. The cover-side positioning portions 49 include, in the X-axis direction, the cover-side positioning portion 49*a* located on the −X direction side of the second sealed portion 42, and a cover-side positioning portion 49*b* (not illustrated) located on the +X direction side of the second sealed portion 42. The screw fixing portions 43 are located on the −Z direction side of the cover front surface 41, the second sealed portions 42, and the cover-side positioning portions 49. The screw fixing portions 43 include a screw fixing portion 43*a* located on the −X direction side of the cover front surface 41, and a screw fixing portion 43*b* (not illustrated) located on the +X direction side of the cover front surface 41.

As illustrated in FIGS. 1 to 3, 8, and 9, the joining member 50 is a plate-like member extending in the X-axis direction. The joining member 50 includes head-fixing screw holes 54 and cover-fixing screw holes 53. The head-fixing screw holes 54 are screw holes for fixing the liquid ejecting heads with the sealing members 30 to the joining member 50 by head-fixing screws 39*s*. The cover-fixing screw holes 53 are screw holes for fixing the cover 40 to the joining member 50 by cover-fixing screws 45*s*.

The joining member 50 of the present embodiment includes a plurality of head-fixing screw holes 54 for fixing the liquid ejecting heads with the sealing members 30*a*, 30*c*, and 30*e* to the side surface on the −Y direction side of the joining member 50, and a plurality of head-fixing screw holes 54 for fixing the liquid ejecting heads with the sealing members 30*b*, 30*d*, and 30*f* to the side surface on the +Y direction side of the joining member 50. Furthermore, to fix the cover 40 to the joining member 50, the joining member 50 of the present embodiment includes two cover-fixing screw holes 53 at positions corresponding to the screw fixing portions 43*a* and 43*b* of the cover 40 on the side surface on the +Z direction side of the joining member 50. In the present embodiment, both ends in the X-axis direction of the joining member 50 are fixed to the liquid ejecting unit holder 90, whereby the liquid ejecting unit 200 is detachably held by the liquid ejecting unit holder 90.

Figure 12:
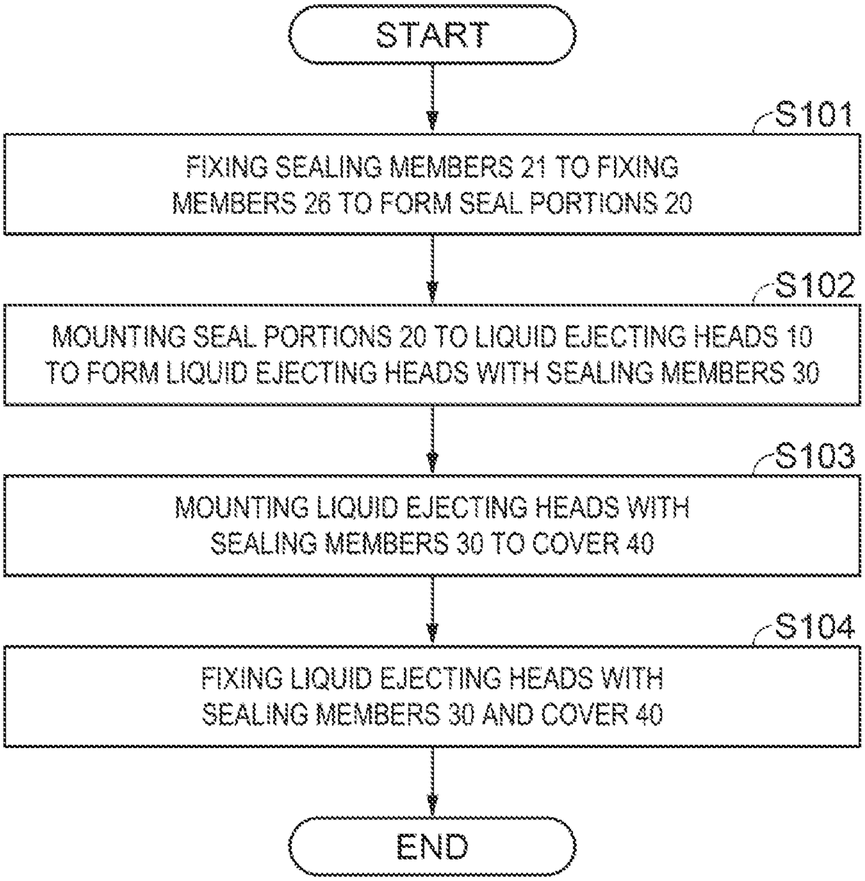
FIG. 12 is a flowchart illustrating an example of a method of manufacturing a liquid ejecting unit.

Next, a procedure for assembling the liquid ejecting unit 200 according to the present embodiment will be described with reference to the flowchart illustrated in FIG. 12. The procedure for assembling the liquid ejecting unit 200 according to the present embodiment corresponds to the method of manufacturing the liquid ejecting unit 200.

When assembling the liquid ejecting unit 200, first, in step S101, the sealing members 21 are fixed to the fixing members 26 to form the seal portions 20. After step S101 is executed, step S102 is executed.

In step S102, the seal portions 20 are joined to the liquid ejecting heads 10 to form the liquid ejecting heads with the sealing members 30. In step S102, as illustrated in FIG. 2, for example, the seal portions 20 are moved in the −Z direction from a state of being away from the liquid ejecting heads 10, and are joined to the liquid ejecting heads 10. In this case, the −Z direction is an example of a joining direction in which the seal portions 20 are joined to the liquid ejecting heads 10. Furthermore, the Z-axis direction is an example of an attachment/detachment direction in which the seal portions 20 are attached to and detached from the liquid ejecting heads 10.

In the process of joining the seal portions 20 to the liquid ejecting heads 10, moving the seal portions 20 in the −Z direction toward the liquid ejecting heads 10 brings the first seal portions 23 of the seal portions 20 into contact with the head covers 15 of the liquid ejecting heads 10. Moving the seal portions 20 further in the −Z direction causes the surfaces on the +Z direction side of the head covers 15 to pass through the annular first seal portions 23, bringing the curved surfaces on the +Z direction side of the first seal portions 23 into contact with the outer side surfaces of the head covers 15. Consequently, the first seal portions 23 are deformed, from a state illustrated by the two-dot-dash line in FIG. 11, in a direction in which the annular-shaped circumferential length formed by the first seal portions 23 is increased.

At this time, the first seal portions 23 and the fixed portions 24 are coupled by the thin film portions 25. Thus, with the curved surfaces on the −Z direction side of the first seal portions 23 being in contact with the first sealed portions 13 provided on the outer side surfaces of the head covers 15 and sealing the first sealed portions 13, the seal portions 20 can be smoothly moved in the −Z direction of the outer side surfaces. Furthermore, since the fixed portions 24 are provided between the first seal portions 23 and the second seal portions 22, the deformation caused when the first seal portions 23 seal the first sealed portions 13 can suppress the second seal portions 22 from being deformed.

Figure 11:
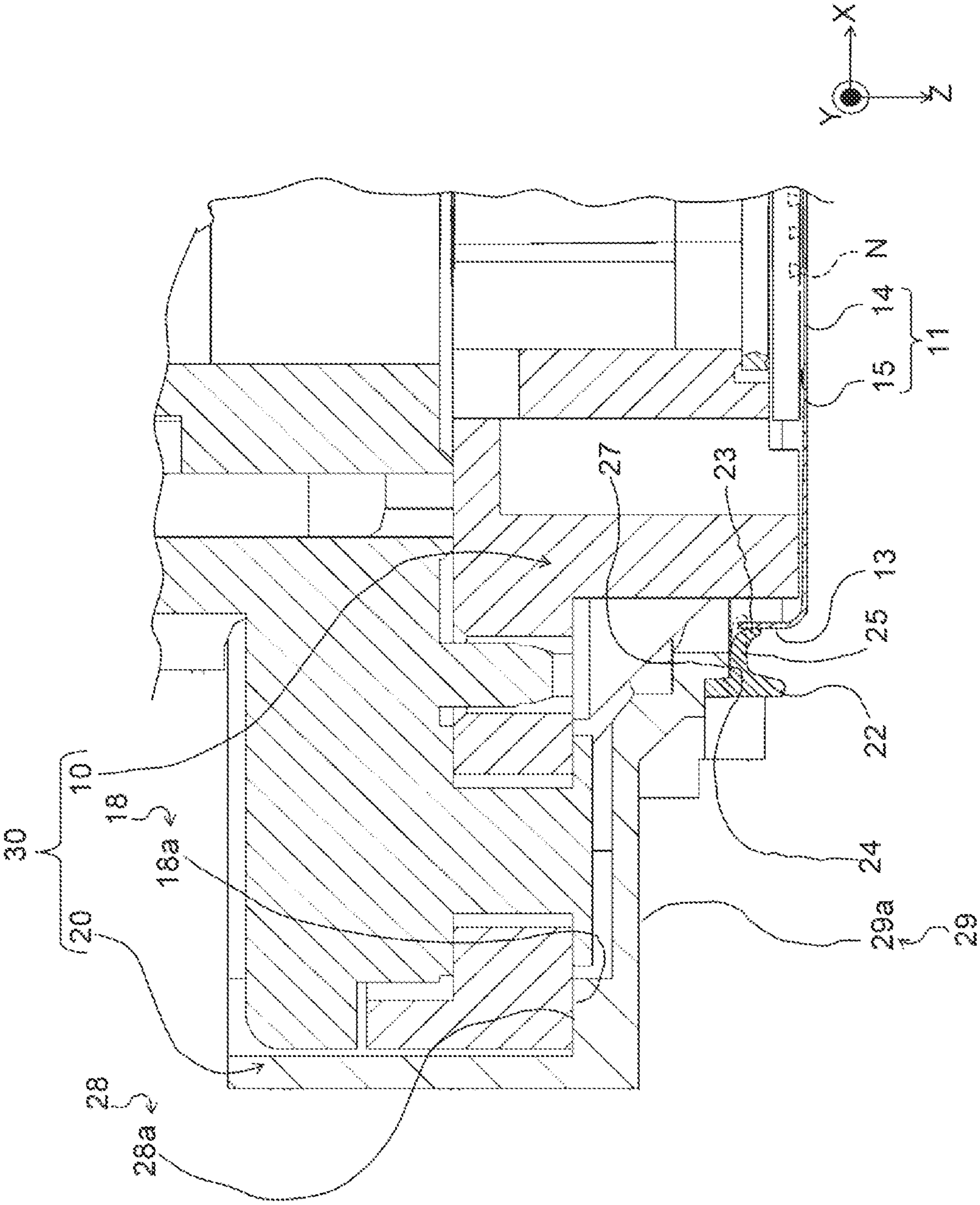
FIG. 11 is a cross-sectional view of a main portion of a liquid ejecting head with a sealing member.

When the seal portions 20 are moved further in the −Z direction after the first seal portions 23 come into contact with the first sealed portions 13, with the first seal portions 23 being in contact with the first sealed portions 13 and sealing the first sealed portions 13 as illustrated in FIG. 11, the first fixed member-side positioning portions 28 included in the fixing members 26 of the seal portions 20 come into contact with the head-side positioning portions 18 of the liquid ejecting heads 10. As a result, the positions in the Z-axis direction between the liquid ejecting heads 10 and the fixing members 26 included in the seal portions 20 are defined. Consequently, the liquid ejecting heads with the sealing members 30 are formed, which completes the execution of step S102. By executing step S102, the method of manufacturing the liquid ejecting unit 200 includes joining the seal portions 20 to the liquid ejecting heads 10 to bring the first seal portions 23 of the sealing members 21 into contact with the first sealed portions 13 of the liquid ejecting heads 10 and seal the first sealed portions 13. After step S102 is executed, step S103 is executed.

In step S103, the liquid ejecting heads with the sealing members 30 are mounted on the cover 40. In step S103, the liquid ejecting heads with the sealing members 30, formed by joining the seal portions 20 illustrated in FIG. 2 to the liquid ejecting heads 10, are moved in the +Z direction from a state of being away from the cover 40 and are joined to the cover 40. In this case, the +Z direction is an example of a mounting direction in which the liquid ejecting heads with the sealing members 30 are mounted on the cover 40. Thus, the −Z direction side is an example of an opposite direction side from the mounting direction.

In the process of mounting the liquid ejecting heads with the sealing members 30 to the cover 40, moving the liquid ejecting heads with the sealing members 30 in the +Z direction toward the cover 40 brings the second seal portions 22 of the sealing members 21 included in the seal portions 20 into contact with the second sealed portions 42 of the cover 40 from the −Z direction side. In other words, the second sealed portions 42 of the cover 40 are disposed at positions overlapping the second seal portions 22 of the sealing members 21 included in the seal portions 20 when the liquid ejecting unit 200 is viewed from the +Z direction side. According to this configuration, the size in the X-axis direction of the cover 40 and the size in the Y-axis direction thereof are easily reduced. Thus, the size in the X-axis direction of the liquid ejecting unit 200 and the size in the Y-axis direction thereof are easily reduced. The X-axis direction and the Y-axis direction are examples of directions intersecting the mounting direction in which the liquid ejecting heads 10 are mounted on the cover 40.

After the second seal portions 22 of the sealing members 21 included in the seal portions 20 come into contact with the second sealed portions 42 of the cover 40, moving the liquid ejecting heads with the sealing members 30 further in the +Z direction causes the second seal portions 22 to be pressed against the second sealed portions 42 and be deformed to seal the second sealed portions 42.

In the seal members 21 of the present embodiment, the first seal portions 23 are located on the −Z direction side of the second seal portions 22. Consequently, in the process of mounting the liquid ejecting heads with the sealing members 30 to the cover 40, the first seal portions 23 are less likely to come into contact with the cover 40, which makes it possible to suppress the sealing state of the first sealed portions 13 from becoming unstable due to the first seal portions 23.

Furthermore, in the seal members 21 of the present embodiment, the fixed portions 24 are provided between the first seal portions 23 and the second seal portions 22. Furthermore, the first seal portions 23, the fixed portions 24, and the second seal portions 22 of the sealing members 21 are provided, in a direction along the liquid ejecting surfaces 11, in this order from a position closer to the liquid ejecting heads 10 toward a position farther therefrom. Consequently, deformation of the second seal portions 22 caused when the second seal portions 22 seal the second sealed portions 42 makes it less likely for the first seal portions 23 to be deformed, which makes it possible to suppress the sealing state of the first sealed portions 13 from becoming unstable due to the first seal portions 23.

Furthermore, after the second seal portions 22 of the sealing members 21 included in the seal portions 20 come into contact with the second sealed portions 42 of the cover 40, with the second seal portions 22 sealing the second sealed portions 42, the second fixing member-side positioning portions 29 included in the fixing members 26 of the seal portions 20 come into contact with the cover-side positioning portions 49 of the cover 40, whereby the positions in the Z-axis direction between the fixing members 26 and the cover 40 are defined. As a result, the positions in the Z-axis direction between the liquid ejecting head 10 and the cover 40 are defined. This completes the execution of step S103. By executing step S103, the method of manufacturing the liquid ejecting unit 200 includes mounting the liquid ejecting heads with the sealing members 30 to the cover 40 to bring the second seal portions 22 of the sealing members 21 into contact with the second sealed portions 42 of the cover 40 and seal between the liquid ejecting heads 10 and the cover 40. After step S103 is executed, step S104 is executed.

In step S104, the liquid ejecting heads with the sealing members 30 and the cover 40 are fixed to each other. In the present embodiment, the cover 40 is fixed to the joining member 50 to which the liquid ejecting heads with the sealing members 30*a*, 30*b*, 30*c*, 30*d*, 30*e*, and 30*f* were fixed, whereby the liquid ejecting heads with the sealing members 30 and the cover 40 are fixed to each other. This completes the execution of step S104.

As described above, according to the liquid ejecting head with the sealing member 30, the liquid ejecting unit 200, the liquid ejecting device 500, and the method of manufacturing the liquid ejecting unit 200 according to embodiment 1, the following advantages can be obtained.

The liquid ejecting head with the sealing member 30 to be mounted on the cover 40 includes: the liquid ejecting head 10 including the liquid ejecting surface 11 configured to eject ink; the fixing member 26 configured to be attachable to and detachable from the liquid ejecting head 10; and the sealing member 21 configured to seal the liquid ejecting head 10 and the fixing member 26; wherein the sealing member 21 includes the first seal portion 23 and the second seal portion 22, the fixing member 26 is joined to the liquid ejecting head 10 to cause the first seal portion 23 to seal between the liquid ejecting head 10 and the fixing member 26, the liquid ejecting head 10 to which the fixing member 26 is joined is mounted on the cover 40 in the +Z direction, and the second seal portion 22 seals between the fixing member 26 and the cover 40 to seal between the liquid ejecting head 10 and the cover 40. According to this configuration, the fixing member 26 is joined to the liquid ejecting head 10 to cause the sealing member 21 to seal between the liquid ejecting head 10 and the fixing member 26, and this liquid ejecting head 10 is mounted on the cover 40 to cause the sealing member 21 to seal between the fixing member 26 and the cover 40, whereby the seal between the liquid ejecting head 10 and the cover 40 can be established. Thus, when ensuring one of the seals, the sealing performance of the other of the seals is less likely to decrease.

The sealing member 21 includes the fixed portion 24 fixed to the fixing member 26. The fixed portion 24 is provided between the first seal portion 23 and the second seal portion 22. According to this configuration, the effect of deformation of the second seal portion 22 caused when sealing the liquid ejecting head 10 and the cover 40 is less likely to affect the first seal portion 23, and the sealing performance of the first seal portion 23 is less likely to decrease.

The first seal portion 23 seals the first sealed portion 13 provided on the outer side surface of the head cover 15, whereby the seal between the liquid ejecting head 10 and the fixing member 26 is established. The first seal portion 23, the fixed portion 24, and the second seal portion 22 are provided, in a direction along the liquid ejecting surface 11, in this order from a position closer to the liquid ejecting head 10 toward a position farther therefrom. According to this configuration, the effect of deformation of the second seal portion 22 caused when sealing the liquid ejecting head 10 and the cover 40 is further less likely to affect the first seal portion 23, and the sealing performance of the first seal portion 23 is less likely to decrease.

The sealing member 21 includes the thin film portion 25 coupling the first seal portion 23 and the fixed portion 24. According to this configuration, deformation of the thin film portion 25 makes it easier for the first seal portion 23 to come into contact with the first sealed portion 13, and makes it easier for the first seal portion 23 to seal the first sealed portion 13. Furthermore, the effect of deformation of the first seal portion 23 caused when sealing the first sealed portion 13 is less likely to affect the second seal portion 22.

The liquid ejecting unit 200 includes the liquid ejecting heads with the sealing members 30, and the cover 40 configured to be attachable to and detachable from the liquid ejecting heads with the sealing members 30. According to this configuration, the liquid ejecting unit 200 can be provided in which the sealing performance between the liquid ejecting heads 10 and the cover 40 is less likely to decrease.

When the liquid ejecting heads 10 to which the fixing members 26 were joined are mounted on the cover 40 in the +Z direction, the second seal portions 22 come into contact with the second sealed portions 42 of the cover 40 from the −Z direction side to seal between the fixed members 26 and the cover 40. According to this configuration, in the cover 40, the sizes in directions intersecting the +Z direction in which the liquid ejecting heads 10 are mounted on the cover 40 are easily reduced. Thus, in the liquid ejecting unit 200, the sizes in directions intersecting the +Z direction in which the liquid ejecting heads 10 are mounted on the cover 40 are easily reduced.

The cover 40 includes the cover front surface 41 that constitutes the ejecting surface 201 of the liquid ejecting unit 200 including the liquid ejecting surfaces 11. The second sealed portions 42 are provided on an opposite surface of the cover front surface 41. The first seal portions 23 are located on the −Z direction side of the second seal portions 22. According to this configuration, the first seal portions 23 are less likely to come into contact with the cover 40, and the sealing performance of the sealing members 21 is less likely to decrease.

When the direction in which the fixing members 26 are attached to and detached from the liquid ejecting heads 10 is the Z-axis direction, after the first seal portions 23 seal between the liquid ejecting heads 10 and the fixing members 26, the head-side positioning portions 18 included in the liquid ejecting heads 10 and the first fixing member-side positioning portions 28 included in the fixing members 26 come into contact with each other to define the positions in the Z-axis direction between the liquid ejecting heads 10 and the fixing members 26; and after the second seal portions 22 come into contact with the second sealed portions 42, the second fixing member-side positioning portions 29 included in the fixing members 26 and the cover-side positioning portions 49 included in the cover 40 come into contact with each other to define the positions in the Z-axis direction between the liquid ejecting heads 10 and the cover 40. According to this configuration, the liquid ejecting heads 10 are positioned relative to the fixed members 26 and the cover 40. Thus, the sealing performance of the sealing members 21 is less likely to decrease. Furthermore, since the positions in the Z-axis direction between the liquid ejecting head 10 and the cover 40 are defined, when the liquid ejecting device 500 includes the liquid ejecting unit 200, variation in the distance between the liquid ejecting surfaces 11 of the liquid ejecting heads 10 and the printing sheet P can be reduced. Variation in the distance between the cover front surface 41 of the cover 40 and the printing sheet P can also be reduced. Thus, disturbance in the air flow between the liquid ejecting heads 10 and the printing sheet P can be suppressed, so the printing accuracy of the liquid ejecting device 500 is easily ensured.

The liquid ejecting device 500 includes the liquid ejecting unit 200. According to this configuration, the liquid ejecting device 500 includes a liquid ejecting unit 200 in which the sealing performance between the liquid ejecting heads 10 and the cover 40 is less likely to decrease. Thus, disturbance in the air flow between the liquid ejecting heads 10*a*, 10*b*, 10*c*, 10*d*, 10*e*, and 10*f* and the printing sheet P can be suppressed. Furthermore, it is possible to suppress foreign substances such as ink from entering the liquid ejecting unit 200 from between the liquid ejecting heads 10*a*, 10*b*, 10*c*, 10*d*, 10*e*, and 10*f* and the cover 40.

A method of manufacturing the liquid ejecting unit 200 includes: joining the fixing members 26 to which the sealing members 21 were fixed to the liquid ejecting heads 10 to bring the sealing members 21 into contact with the liquid ejecting heads 10; and mounting the liquid ejecting heads 10 to which the fixing members 26 were joined to the cover 40 to bring the sealing members 21 into contact with the cover 40 and seal between the liquid ejecting heads 10 and the cover 40. According to this configuration, the fixing members 26 are joined to the liquid ejecting heads 10 to ensure the seal between the liquid ejecting heads 10 and the sealing members 21, and these liquid ejecting heads 10 are mounted on the cover 40 to ensure the seal between the liquid ejecting heads 10 and the cover 40. Thus, when ensuring one of the seals, the sealing performance of the other of the seals is less likely to decrease.

The liquid ejecting head with the sealing member 30, the liquid ejecting unit 200, the liquid ejecting device 500, and the method of manufacturing the liquid ejecting unit 200 according to the above-described embodiments of the present disclosure are based on the configurations described above. However, as a matter of course, the configurations may be partially modified, omitted, or otherwise changed without departing from the gist of the disclosure of the present application. Furthermore, the above-described embodiments and other embodiments to be described below may be carried out in combination as long as no technical contradiction arise. Hereinafter, other embodiments will be described.

In the above-described embodiments, the plurality of nozzles N constituting each of the nozzle groups 12*a*, 12*b*, 12*c*, 12*d*, 12*e*, and 12*f* included in the liquid ejecting heads 10*a*, 10*b*, 10*c*, 10*d*, 10*e*, and 10*f* need not form two rows of nozzle rows, with each row aligned in the X-axis direction and the two rows spaced apart in the Y-axis direction. For example, the plurality of nozzles N constituting each of the nozzle groups 12*a*, 12*b*, 12*c*, 12*d*, 12*e*, and 12*f* may form four rows of nozzle rows, with each row aligned in an inclination direction intersecting the X-axis direction and the Y-axis direction and the four rows spaced apart in the inclination direction. In this case, the liquid ejecting unit 200 may include liquid ejecting heads with the sealing members 30*a*, 30*b*, 30*c*, 30*d*, 30*e*, and 30*f* so that each of the nozzle groups 12*a*, 12*b*, 12*c*, 12*d*, 12*e*, and 12*f* are aligned in the X-axis direction.

In the above-described embodiments, the number of the liquid ejecting heads with the sealing members 30 included in the liquid ejecting unit 200 may be more than six or fewer than six. In this case, for example, the liquid ejecting unit 200 may include one liquid ejecting head with the sealing member 30 and one cover 40.

In the above-described embodiments, the sealing member 21 may be integrally molded with the fixing member 26 and thus need not be fixed to the fixing member 26. In this case, for example, the fixed portion 24 of the sealing member 21 may be fixed by being adhered to the fixing portion 27 of the fixing member 26, or may be fixed by being fitted to the fixing portion 27 of the fixing member 26. Alternatively, the fixing member 26 on which the sealing member 21 is placed so that the fixed portion 24 of the sealing member 21 corresponds to the fixing portion 27 of the fixing member 26 may be joined to the liquid ejecting head 10, and the fixed portion 24 of the sealing member 21 may be pressed against the fixing portion 27 of the fixing member 26 to fix the sealing member 21 to the fixing member 26.

Figure 13:
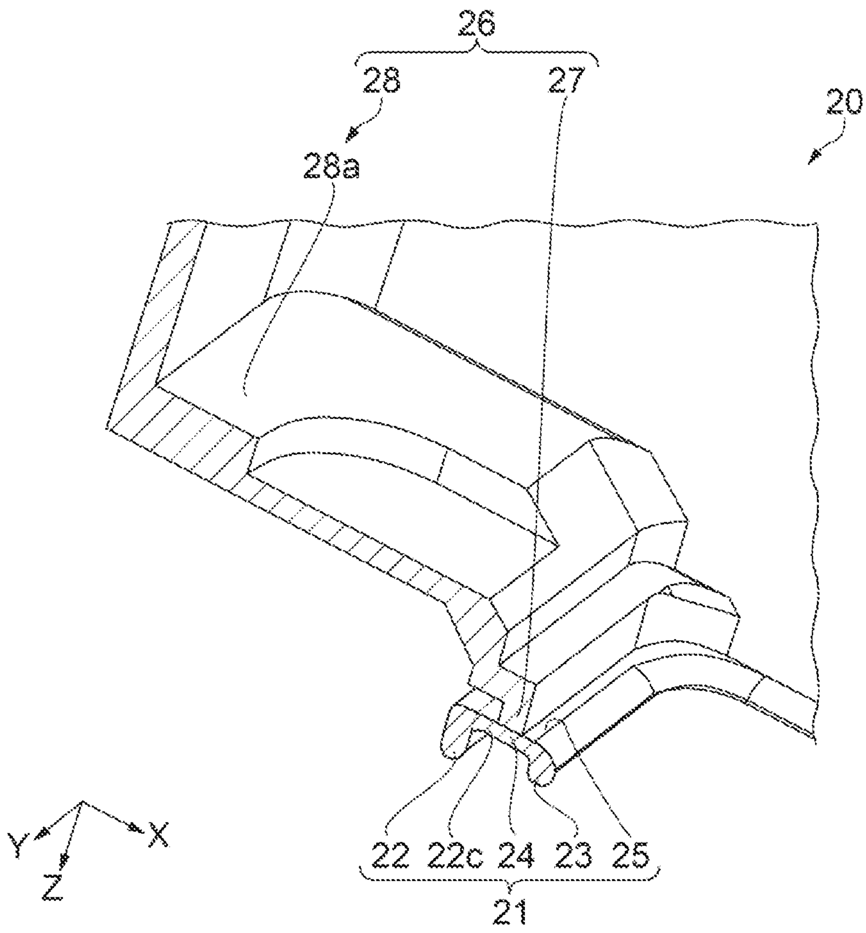
FIG. 13 is a cross-sectional perspective view of a seal portion according to another embodiment in which a portion of a sealing member is modified.

In the above-described embodiments, in the sealing member 21, the −Z direction side of the second seal portion 22 need not be in contact with the fixing member 26. In this case, for example, as illustrated in FIG. 13, the sealing member 21 may include a thin film-like coupling portion 22*c* that couples the second seal portion 22 and the fixed portion 24 together.

Figure 14:
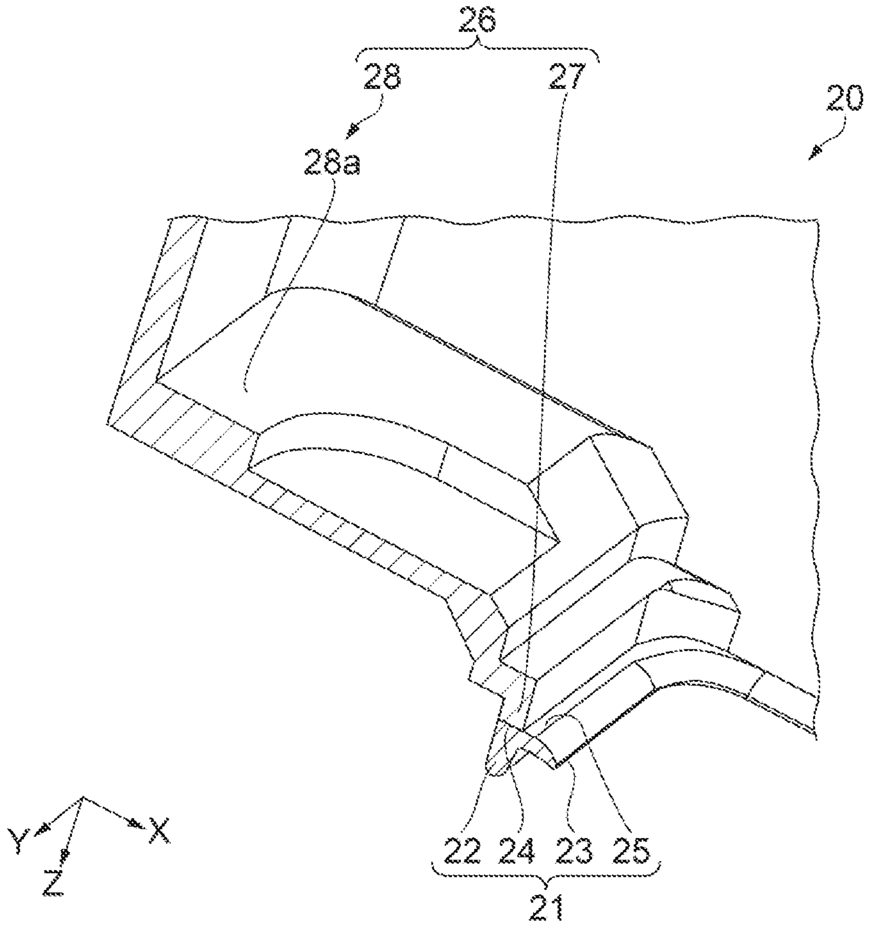
FIG. 14 is a cross-sectional perspective view of a seal portion according to another embodiment in which a portion of a sealing member is modified.

In the above-described embodiments, the first seal portion 23, the fixed portion 24, and the second seal portion 22 of the sealing member 21 need not be provided, in a direction along the liquid ejecting surface 11, in this order from a position closer to the liquid ejecting head 10 toward a position farther therefrom. For example, as illustrated in FIG. 14, the second seal portion 22 may be provided at a position overlapping the fixed portion 24 when the sealing member 21 is viewed from the +Z direction side. In this case, the fixed portion 24 need not be provided between the first seal portion 23 and the second seal portion 22 in a direction along the liquid ejecting surface 11.

In the above-described embodiments, the transport unit 70 need not transport the printing sheet P in the +Y direction. For example, the transport unit 70 may wind the printing sheet P on a rotating drum that rotates about a central axis along the X-axis as the rotation axis and transport the same. Then, the liquid ejecting unit 200 may be disposed inclined along the outer circumferential surface having a circular arc shape of the rotating drum. In this case, the liquid ejecting unit 200 may eject ink from the plurality of nozzles N constituting the nozzle group 12 in a direction intersecting the Z-axis direction to form an image on the printing sheet P. For example, when the ink ejected from the nozzles N is a UV ink that is cured by irradiation with ultraviolet rays, an irradiator that irradiates ultraviolet rays may be provided downstream in the transport direction of the liquid ejecting unit 200.

In the above-described embodiments, the liquid ejecting device 500 need not be a line printer. For example, the liquid ejecting device 500 may be a so-called serial printer in which the carriage that holds the liquid ejecting unit 200 ejects ink from the nozzles N, while moving along the X-axis, to form an image on the printing sheet P. In this case, of the plurality of nozzles N constituting the nozzle group 12, the dimension between nozzles N at both ends in the X-axis direction may be shorter than the width dimension of the printing sheet P.

In the above-described embodiments, the liquid ejecting head with the sealing member 30 need not be mounted on the cover 40. For example, the liquid ejecting head with the sealing member 30 may be directly mounted on the liquid ejecting unit holder 90. In this case, the liquid ejecting unit holder 90 is a mounting member to which the liquid ejecting head with the sealing member 30 is mounted. Furthermore, for example, the liquid ejecting head with the sealing member 30 may be directly mounted on a carriage of a serial printer in which the carriage ejects ink from the nozzles N, while moving along the X-axis, to form an image on the printing sheet P. In this case, the carriage is a mounting member to which the liquid ejecting head with the sealing member 30 is mounted.

What is claimed is:

1. A liquid ejecting head with a sealing member to be mounted on a mounting member, the liquid ejecting head with the sealing member comprising:
a liquid ejecting head including a liquid ejecting surface configured to eject liquid;
a fixing member configured to be attachable to and detachable from the liquid ejecting head; and
the sealing member configured to seal the liquid ejecting head and the fixing member; wherein
the sealing member includes a first seal portion, a second seal portion, and a fixed portion,
the first seal portion seals the liquid ejecting head and the fixing member,
the second seal portion seals the fixing member of the liquid ejecting head mounted from a mounting direction and the mounting member,
the fixed portion is fixed to the fixing member, and
in a direction along the liquid ejecting surface, the first seal portion, the fixed portion, and the second seal portion are provided in this order from a position closer to the liquid ejecting head toward a position farther therefrom.

2. The liquid ejecting head with the sealing member according to claim 1, wherein
the fixed portion is provided between the first seal portion and the second seal portion.

3. The liquid ejecting head with the sealing member according to claim 2, wherein
the first seal portion seals a first sealed portion provided on a side surface of the liquid ejecting head to seal the liquid ejecting head and the fixing member.

4. The liquid ejecting head with the sealing member according to claim 2, wherein the sealing member includes a thin film portion configured to couple the first seal portion and the fixed portion.

5. A liquid ejecting unit comprising:
the liquid ejecting head with the sealing member according to claim 1; and
a cover as the mounting member configured to be attachable to and detachable from the liquid ejecting head with the sealing member.

6. The liquid ejecting unit according to claim 5, wherein, when the liquid ejecting head to which the fixing member is joined is mounted on the cover in the mounting direction, the second seal portion comes into contact with a second sealed portion of the cover from the mounting direction to seal the fixing member and the cover.

7. The liquid ejecting unit according to claim 6, wherein
the cover includes a cover front surface that constitutes an ejecting surface of the liquid ejecting unit including the liquid ejecting surface,
the second sealed portion is provided on an opposite surface of the cover front surface, and
the first seal portion is located on an opposite direction side in the mounting direction from the second seal portion.

8. The liquid ejecting unit according to claim 6, wherein
when the direction in which the fixing member is attached to and detached from the liquid ejecting head is an attachment/detachment direction,
after the first seal portion seals the liquid ejecting head and the fixing member, a head-side positioning portion included in the liquid ejecting head and a first fixing member-side positioning portion included in the fixing member come into contact with each other to define positions in the attachment/detachment direction of the liquid ejecting head and the fixing member and
after the second seal portion comes into contact with the second sealed portion, a second fixing member-side positioning portion included in the fixing member and a cover-side positioning portion included in the cover come into contact with each other to define positions in a direction along the mounting direction of the liquid ejecting head and the cover.

9. A liquid ejecting device comprising the liquid ejecting unit according to claim 5.

10. A liquid ejecting unit, comprising:
a liquid ejecting head with a sealing member; and
a cover as a mounting member configured to be attachable to and detachable from the liquid ejecting head with the sealing member, wherein
the liquid ejecting head with the sealing member comprising:
the liquid ejecting head including a liquid ejecting surface configured to eject liquid;
a fixing member configured to be attachable to and detachable from the liquid ejecting head; and
the sealing member configured to seal the liquid ejecting head and the fixing member,
the sealing member includes a first seal portion and a second seal portion,
the first seal portion seals the liquid ejecting head and the fixing member,
the second seal portion seals the fixing member of the liquid ejecting head mounted from a mounting direction and the mounting member, and
when the liquid ejecting head to which the fixing member is joined is mounted on the cover in the mounting direction, the second seal portion comes into contact with a second sealed portion of the cover from the mounting direction to seal the fixing member and the cover.

11. The liquid ejecting unit according to claim 10, wherein
the cover includes a cover front surface that constitutes an ejecting surface of the liquid ejecting unit including the liquid ejecting surface,
the second sealed portion is provided on an opposite surface of the cover front surface, and
the first seal portion is located on an opposite direction side in the mounting direction from the second seal portion.

12. A liquid ejecting device comprising the liquid ejecting unit according to claim 10.

* * * * *